United States Patent
Asada et al.

(10) Patent No.: US 11,378,054 B2
(45) Date of Patent: Jul. 5, 2022

(54) DRIVING SOURCE CONTROL APPARATUS

(71) Applicant: TOYOTA JIDOSHA KABUSHIKI KAISHA, Toyota (JP)

(72) Inventors: Motoshi Asada, Toyota (JP); Hiroya Tanaka, Nagoya (JP); Shigeru Itabashi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/475,678

(22) Filed: Sep. 15, 2021

(65) Prior Publication Data

US 2022/0154680 A1 May 19, 2022

(30) Foreign Application Priority Data

Nov. 13, 2020 (JP) .............................. JP2020-189068

(51) Int. Cl.
*F02P 5/15* (2006.01)
*F02D 41/14* (2006.01)
*B60K 17/22* (2006.01)

(52) U.S. Cl.
CPC ............ *F02P 5/1502* (2013.01); *B60K 17/22* (2013.01); *F02D 41/1498* (2013.01); *F02D 2041/1432* (2013.01); *F02D 2200/101* (2013.01); *F02D 2200/1002* (2013.01)

(58) Field of Classification Search
CPC ......... F02D 41/1498; F02D 2041/1432; F02D 2200/1012; F02D 2200/1015; F02D 2250/28; F02P 5/1502; F02P 5/1504; F02P 5/1508; F02P 5/151
See application file for complete search history.

(56) References Cited

U.S. PATENT DOCUMENTS 4,353,341 A * 10/1982 Henning .................. F02P 9/00
123/406.24
4,509,477 A * 4/1985 Takao .................. F02D 41/1498
123/339.11

(Continued)

FOREIGN PATENT DOCUMENTS

JP 58048738 A * 3/1983
JP 01163467 A * 6/1989

(Continued)

*Primary Examiner* — John M Zaleskas
(74) *Attorney, Agent, or Firm* — Oblon, McClelland, Maier & Neustadt, L.L.P.

(57) ABSTRACT

A period and amplitude of torsional fluctuations of a drive-train to be obtained by applying a phase-lead process, which is a process of advancing a phase by a predetermined amount, to a difference between a rotation speed of a driving source and a rotation speed of the driving source, computed from a rotation speed of a drive shaft, are repeatedly computed. When the computed amplitude of the torsional fluctuations in a predetermined period becomes greater than or equal to a predetermined amplitude at least two times consecutively, predetermined control is executed. In the predetermined control, the driving source is controlled at a torque obtained by adding a correction torque opposite in phase to the torsional fluctuations to a target torque. As a result, vibrations of a driving apparatus are further properly reduced.

3 Claims, 5 Drawing Sheets

(56) References Cited

U.S. PATENT DOCUMENTS

| | | | | | |
|---|---|---|---|---|---|
| 4,887,573 | A | * | 12/1989 | Fujiwara | F02P 5/1502 123/406.51 |
| 4,909,217 | A | * | 3/1990 | Takahashi | F02D 41/1498 123/361 |
| 4,928,652 | A | * | 5/1990 | Shinya | F02P 5/1504 477/111 |
| 5,379,634 | A | * | 1/1995 | Kuroda | G01M 15/11 73/114.04 |
| 5,573,474 | A | * | 11/1996 | Marsh | F02P 5/1504 477/91 |
| 5,669,354 | A | * | 9/1997 | Morris | F02D 41/1498 123/406.24 |
| 6,574,535 | B1 | * | 6/2003 | Morris | B60K 6/48 701/22 |
| 6,718,943 | B1 | * | 4/2004 | De La Salle | F02P 5/1504 123/406.24 |
| 2003/0116130 | A1 | * | 6/2003 | Kisaka | F02P 5/1504 123/406.45 |
| 2003/0168045 | A1 | * | 9/2003 | Mader | F02P 5/1504 123/406.24 |
| 2003/0177846 | A1 | * | 9/2003 | Tamagawa | G01M 1/30 73/862.29 |
| 2005/0182545 | A1 | * | 8/2005 | Baumann | F02D 41/1402 701/53 |
| 2007/0079785 | A1 | * | 4/2007 | Moller | G01M 15/12 123/192.1 |
| 2007/0254772 | A1 | * | 11/2007 | Satou | F02D 41/1498 477/107 |
| 2010/0116247 | A1 | * | 5/2010 | Shikama | F02D 41/1498 123/399 |
| 2011/0202235 | A1 | * | 8/2011 | Oikawa | F02D 11/107 701/36 |
| 2013/0304350 | A1 | * | 11/2013 | Lerede | F02D 41/1498 701/99 |
| 2013/0325277 | A1 | * | 12/2013 | Lerede | B60W 50/0098 701/70 |
| 2013/0325289 | A1 | * | 12/2013 | Ikeda | F02D 41/10 701/101 |

FOREIGN PATENT DOCUMENTS

| | | | |
|---|---|---|---|
| JP | 2010159723 A | * | 7/2010 |
| JP | 2012071792 A | * | 4/2012 |
| JP | 2013122196 A | * | 6/2013 |
| JP | 2014-80919 A | | 5/2014 |

* cited by examiner

DRIVING SOURCE CONTROL APPARATUS

CROSS-REFERENCE TO RELATED APPLICATION

This application claims priority to Japanese Patent Application No. 2020-189068 filed on Nov. 13, 2020, incorporated herein by reference in its entirety.

BACKGROUND

1. Technical Field

The present disclosure relates to a driving source control apparatus and, more specifically, to a driving source control apparatus that controls a driving source.

2. Description of Related Art

A driving source control apparatus is proposed as one of driving source control apparatuses of this type (see, for example, Japanese Unexamined Patent Application Publication No. 2014-080919 (JP 2014-080919 A)). The driving source control apparatus is used for a driving apparatus (vehicle) including a driving source (engine) connected to a drive-train and controls the driving source such that the driving source is driven at a target torque. The apparatus calculates a rate of change in difference between the rotation speed of the engine and an average rotation speed that is an average of the rotation speed of the engine by using the rotation speed (actual rotation speed) of the engine, and corrects the target torque based on the rate of change in difference such that longitudinal vibrations in the driving apparatus due to torsional fluctuations (torsional resonance) of the drive-train are reduced. With this configuration, the vibrations of the driving apparatus can be reduced.

SUMMARY

However, the driving source control apparatus may not be able to properly reduce vibrations. The rotation speed of the engine also fluctuates due to vibrations input from a road surface via the drive-train in addition to torsional vibrations. The driving source control apparatus corrects a target torque based on a rate of change in difference between the rotation speed of the engine and an average rotation speed regardless of whether fluctuations in the rotation speed of the engine are due to torsional fluctuations, so the driving source control apparatus may not be able to properly reduce the vibrations of the driving apparatus.

The present disclosure provides a driving source control apparatus that further properly reduces the vibrations of a driving apparatus.

Some aspects of the driving source control apparatus of the present disclosure are configured as follows.

An aspect of the present disclosure relates to a driving source control apparatus. The driving source control apparatus is used for a driving apparatus including a driving source. The driving source is connected to a drive-train including a drive shaft. The driving source control apparatus is configured to control the driving source such that the driving source is driven at a torque based on a target torque. The driving source control apparatus includes an electronic control unit. The electronic control unit is configured to repeatedly compute a period and amplitude of torsional fluctuations of the drive-train to be obtained by applying a phase-lead process, which is a process of advancing a phase by a predetermined amount, to a difference between a rotation speed of the driving source and a rotation speed of the driving source, computed from a rotation speed of the drive shaft, and, when the computed amplitude of the torsional fluctuations in a predetermined period becomes greater than or equal to a predetermined amplitude at least two times consecutively, execute predetermined control in which the driving source is controlled so as to be driven at a torque obtained by adding a correction torque opposite in phase to the torsional fluctuations to the target torque.

In the driving source control apparatus according to the aspect of the present disclosure, a period and amplitude of torsional fluctuations of the drive-train to be obtained by applying a phase-lead process, which is a process of advancing a phase by a predetermined amount, to a difference between a rotation speed of the driving source and a rotation speed of the driving source, computed from a rotation speed of the drive shaft, are repeatedly computed. When the computed amplitude of the torsional fluctuations in a predetermined period becomes greater than or equal to a predetermined amplitude at least two times consecutively, execute predetermined control in which the driving source is controlled so as to be driven at a torque obtained by adding a correction torque opposite in phase to the torsional fluctuations to the target torque. When the computed amplitude of the torsional fluctuations in the predetermined period becomes greater than or equal to the predetermined amplitude at least two times, it is estimated that torsional resonance of the drive-train is occurring. Therefore, when the computed amplitude of the torsional fluctuations in the predetermined period becomes greater than or equal to the predetermined amplitude at least two times, the vibrations of the driving apparatus are properly reduced by executing the predetermined control. Here, the predetermined amount may be, for example, a value determined by experiment, analysis, or the like in advance as a lag amount of the computed torsional fluctuations of the drive-train from actual torsional fluctuations of the drive-train. The predetermined period may be, for example, a half period or one period. The predetermined amplitude may be, for example, a threshold for determining whether a user feels deterioration of drivability.

In the driving source control apparatus according to the above aspect, the electronic control unit may be configured to, when the computed amplitude of the torsional fluctuations in the predetermined period becomes greater than or equal to the predetermined amplitude a first number of times that is at least two times consecutively, execute the predetermined control, and the electronic control unit may be configured to, during execution of the predetermined control, when the computed amplitude of the torsional fluctuations in the predetermined period becomes greater than or equal to the predetermined amplitude a second number of times greater than the first number of times, stop execution of the predetermined control and control the driving source such that the driving source is driven at the target torque. When the computed amplitude of the torsional fluctuations in the predetermined period becomes greater than or equal to the predetermined amplitude the second number of times, it is estimated that vibrations are amplified by execution of the predetermined control because of an abnormality in the driving apparatus. Therefore, an increase in vibrations is suppressed by stopping execution of the predetermined control and controlling the driving source such that the driving source is driven at the target torque.

In the driving source control apparatus according to the above aspect, the driving source may be an internal combustion engine, in the predetermined control, target ignition timing may be computed such that the torque obtained by adding the correction torque to the target torque is output, a control signal is output to the internal combustion engine such that ignition takes place at the target ignition timing, and the internal combustion engine is controlled by using the control signal, and the predetermined amount may be the sum of a first lag amount corresponding to a time required to compute the target ignition timing, a second lag amount corresponding to a time from when the control signal is output to when ignition takes place in the internal combustion engine, and a third lag amount corresponding to a time from when ignition takes place in the internal combustion engine to when the torque is output from the internal combustion engine. With this configuration, when the driving source is an internal combustion engine, a lag of computed torsional fluctuations of the drive-train from actual torsional fluctuations of the drive-train is properly compensated.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described.

Figure 1:
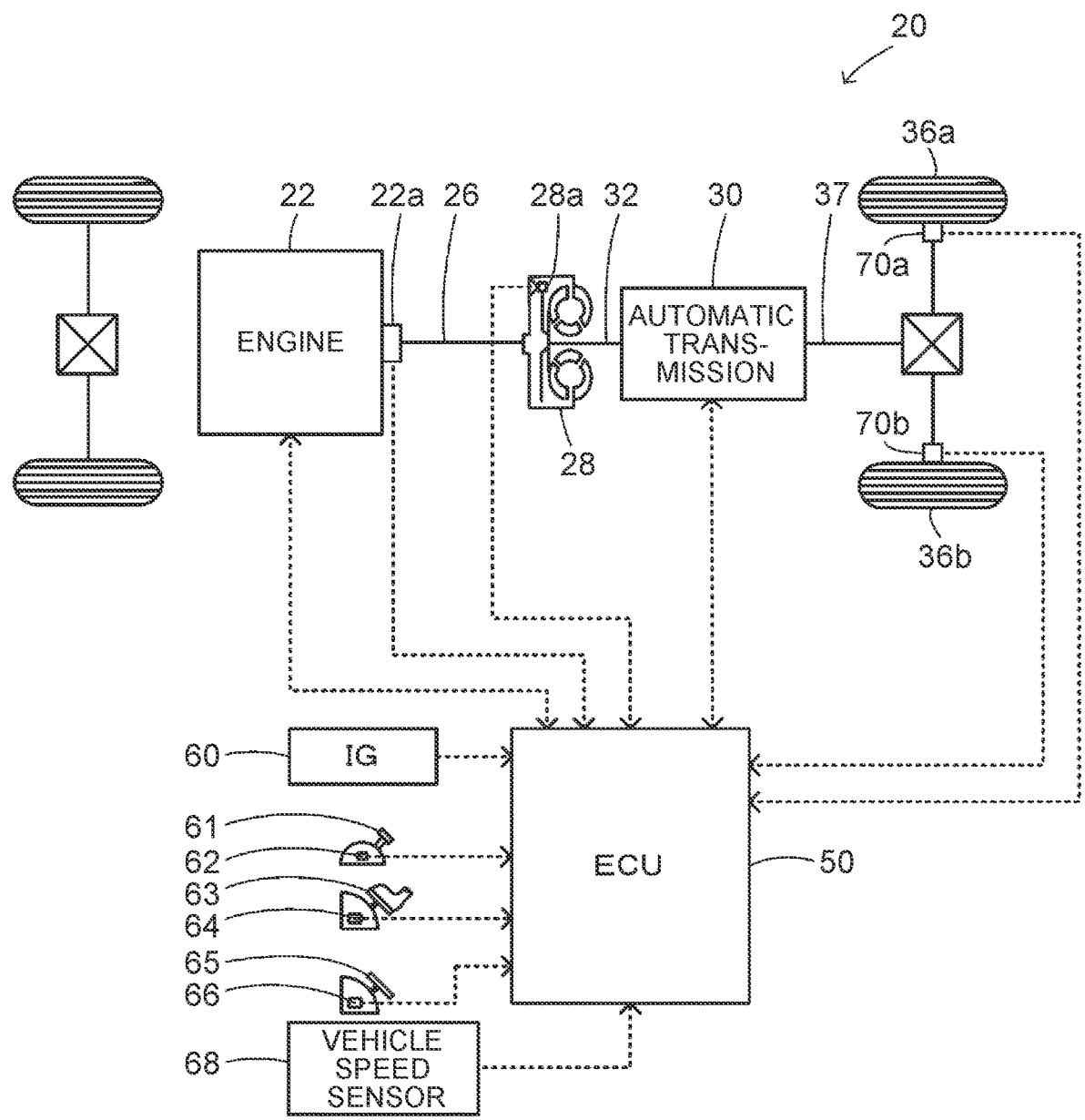
FIG. 1 is a configuration diagram schematically showing the configuration of a vehicle on which a driving source control apparatus that is one embodiment of the present disclosure is mounted.

FIG. 1 is a configuration diagram schematically showing the configuration of a vehicle 20 on which a driving source control apparatus that is one embodiment of the present disclosure is mounted. As shown in the drawing, the vehicle 20 of the embodiment includes an engine 22, a torque converter 28, an automatic transmission 30, and an electronic control unit (hereinafter, referred to as ECU) 50.

Figure 2:
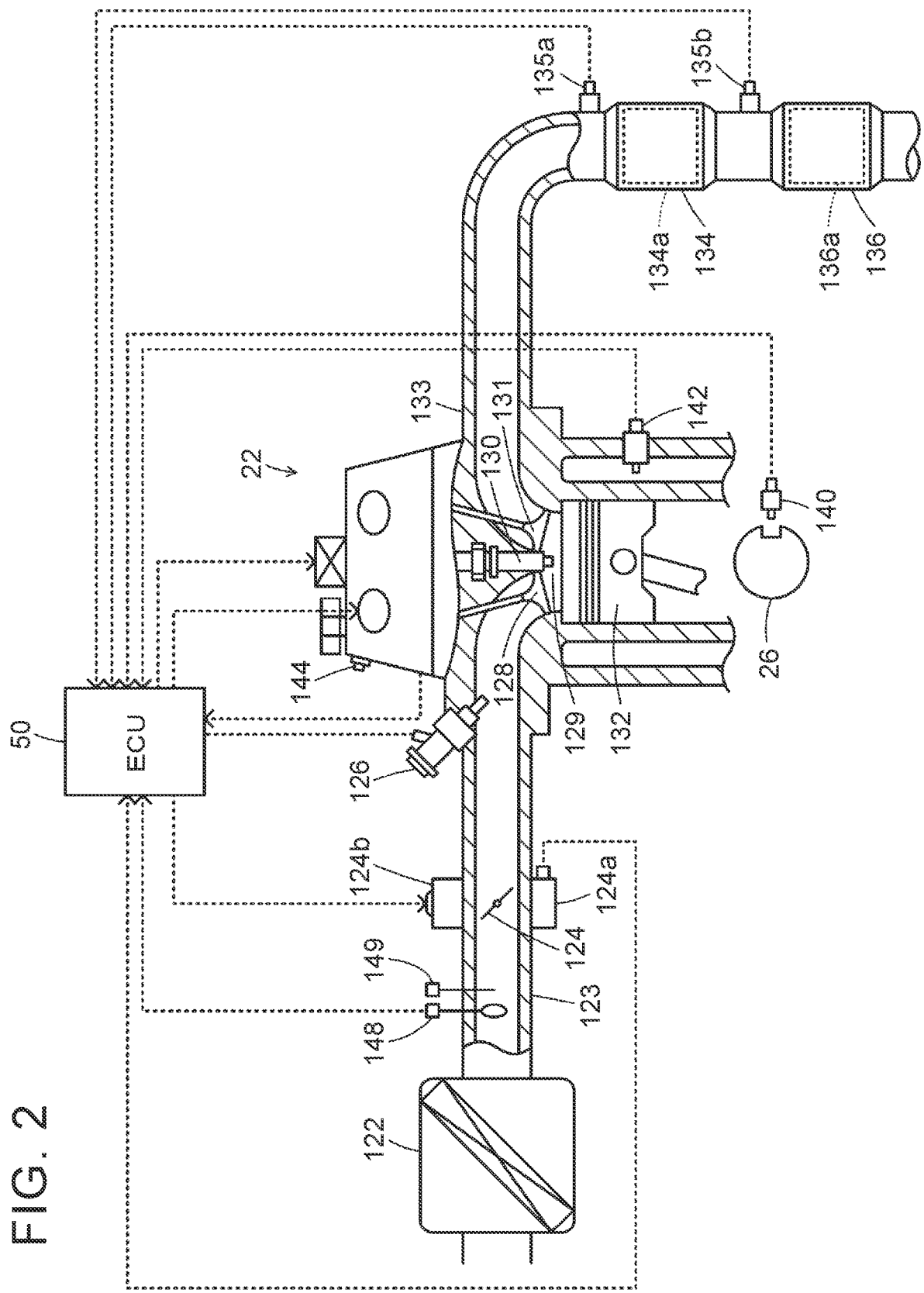
FIG. 2 is a configuration diagram schematically showing the configuration of an engine.

The engine 22 is an internal combustion engine that outputs power by using gasoline, light oil, or the like as fuel. FIG. 2 is a configuration diagram schematically showing the configuration of the engine 22. As shown in the drawing, the engine 22 takes air, cleaned by an air cleaner 122, into an intake pipe 123 and passes the air through a throttle valve 124, mixes air and fuel by injecting fuel from a fuel injection valve 126, and takes the air-fuel mixture into a combustion chamber 129 via an intake valve 128. The engine 22 burns the intake air-fuel mixture with electric spark by using an ignition plug 130 and converts the reciprocating motion of a piston 132 pushed downward by the energy to the rotating motion of a crankshaft 26. Exhaust gas discharged from the combustion chamber 129 to an exhaust pipe 133 via an exhaust valve 131 is emitted to the outside air via exhaust gas control devices 134, 136. Each of the exhaust gas control devices 134, 136 has an associated one of catalysts (three-way catalysts) 134a, 136a that reduce toxic substances such as carbon monoxide (CO), hydrocarbons (HC), and nitrogen oxides (NOx) in exhaust gas.

The torque converter 28 is configured as a general fluid transmission device. The torque converter 28 transmits the power of the crankshaft 26 of the engine 22 to an input shaft 32 of the automatic transmission 30 while amplifying torque or directly transmits the power without amplifying torque. The torque converter 28 includes a pump impeller, a turbine runner, a stator, a one-way clutch, and a hydraulically-driven lockup clutch 28a. The pump impeller is connected to the crankshaft 26 of the engine 22. The turbine runner is connected to the input shaft 32. The stator aligns the flow of hydraulic fluid from the turbine runner to the pump impeller. The one-way clutch restricts the rotation direction of the stator to one direction. The lockup clutch couples the pump impeller and the turbine runner. The drive of the lockup clutch 28a is controlled by the ECU 50.

The automatic transmission 30 is connected to the input shaft 32 and is connected to a drive shaft 37. The drive shaft 37 is connected via a differential gear to axles respectively coupled to drive wheels (front wheels) 36a, 36b. The automatic transmission 30 includes a plurality of planetary gears and a plurality of hydraulically-driven friction engagement elements (clutches and brakes). The automatic transmission 30 shifts into any one of first to fourth forward gears and a reverse gear through engagement and release of the plurality of friction engagement elements to transmit power between the input shaft 32 and the drive shaft 37 or shifts into a neutral state to cancel transmission of power between the input shaft 32 and the drive shaft 37. The drive of the automatic transmission 30 is controlled by the ECU 50. The automatic transmission 30 is not limited to the one of which the highest gear is fourth gear and may be the one of which the highest gear is lower than or equal to third gear or higher than or equal to fifth gear. In the embodiment, the drive shaft 37 and the components closer to the drive wheels 36a, 36b than the drive shaft 37, that is, the torque converter 28, the input shaft 32, and the automatic transmission 30, may be referred to as drive-train.

Although not shown in the drawing, the ECU 50 is configured as a microprocessor that mainly includes a CPU and that, in addition to the CPU, further includes a ROM that stores process programs, a RAM that temporarily stores data, input and output ports, and a communication port.

Signals required to control the operation of the engine 22 and to control the lockup clutch 28a and the automatic transmission 30 are input from various sensors to the ECU 50 via the input port. Examples of the signals to be input to the ECU 50 include a crank angle θcr from a crank position sensor 140, and a coolant temperature Tw from a coolant temperature sensor 142. The crank position sensor 140 detects the rotation position of the crankshaft 26 of the engine 22. The coolant temperature sensor 142 detects the temperature of coolant of the engine 22. Examples of the signals to be input to the ECU 50 also include cam angles θci, θco from a cam position sensor 144. The cam position sensor 144 detects the rotation position of an intake camshaft that opens and closes the intake valve 128 and the rotation position of an exhaust camshaft that opens and closes the exhaust valve 131. Examples of the signals to be input to the ECU 50 also include a throttle opening degree TH from a throttle position sensor 124a, an intake air volume Qa from an air flow meter 148, and an intake air temperature Ta from a temperature sensor 149. The throttle position sensor 124a detects the position of the throttle valve 124. The air flow meter 148 is attached to the intake pipe 123. The temperature sensor 149 is attached to the intake pipe 123. Examples of the signals to be input to the ECU 50 also include an air-fuel ratio AF1 from an air-fuel ratio sensor 135a, and an air-fuel ratio AF2 from an air-fuel ratio sensor 135b. The air-fuel ratio sensor 135a is attached to the exhaust pipe 133 upstream of the exhaust gas control device 134. The air-fuel ratio sensor 135b is attached to the exhaust pipe 133 between the exhaust gas control device 134 and the exhaust gas control device 136. For example, a rotation speed Ni of the input shaft 32 from a rotation speed sensor attached to the input shaft 32 is input via the input port. Examples of the signals to be input to the ECU 50 also include an ignition signal from an ignition switch 60, and a shift position SP from a shift position sensor 62. The shift position sensor 62 detects the operating position of a shift lever 61. Examples of the signals to be input to the ECU 50 include an accelerator operation amount Acc from an accelerator pedal position sensor 64, a brake pedal position BP from a brake pedal position sensor 66, a vehicle speed V from a vehicle speed sensor 68, and wheel speeds Vwa, Vwb that are the rotation speeds of the drive wheels 36a, 36b from wheel speed sensors 70a, 70b. The accelerator pedal position sensor 64 detects the depression amount of an accelerator pedal 63. The brake pedal position sensor 66 detects the depression amount of a brake pedal 65. The wheel speed sensors 70a, 70b are respectively attached to the drive wheels 36a, 36b.

Various control signals required to control the operation of the engine 22 and to control the lockup clutch 28a and the automatic transmission 30 are output from the ECU 50 via the output port. Examples of the various control signals include a control signal to a throttle motor 124b, a control signal to the fuel injection valve 126, and a control signal to the ignition plug 130. The throttle motor 124b adjusts the position of the throttle valve 124. Examples of the various control signals also include a control signal to the lockup clutch 28a of the torque converter 28, and a control signal to a hydraulic circuit of the automatic transmission 30.

The ECU 50 computes the rotation speed Ne of the engine 22 based on the crank angle θcr from the crank position sensor 22a or computes the rotation speed Nds of the drive shaft 37 by using an average of the wheel speeds Vwa, Vwb of the drive wheels 36a, 36b from the wheel speed sensors 70a, 70b.

In the vehicle 20 of the thus configured embodiment, the ECU 50 executes the following travel control. In travel control, the ECU 50 sets a required drive torque Tdrv* required to run based on an accelerator operation amount Acc and a vehicle speed V. The ECU 50 sets a target gear ratio Gr* of the automatic transmission 30 based on the required drive torque Tdrv* and controls the hydraulic circuit of the automatic transmission 30 such that the gear ratio Gr of the automatic transmission 30 becomes a target gear ratio Gr*. The ECU 50 sets a required torque Tin* of the input shaft 32 of the automatic transmission 30 based on the required drive torque Tdrv* and the gear ratio Gr of the automatic transmission 30 and sets a target torque Te* of the engine 22 such that the required torque Tin* is output to the input shaft 32 of the automatic transmission 30. The ECU 50 executes intake air volume control, fuel injection control, ignition control, and the like over the engine 22 based on the target torque Te*. Intake air volume control is executed by controlling the opening degree of the throttle valve 124. Fuel injection control is executed by controlling the fuel injection amount from the fuel injection valve 126. Ignition control is executed by controlling the ignition timing of the ignition plug 130.

Figure 3:
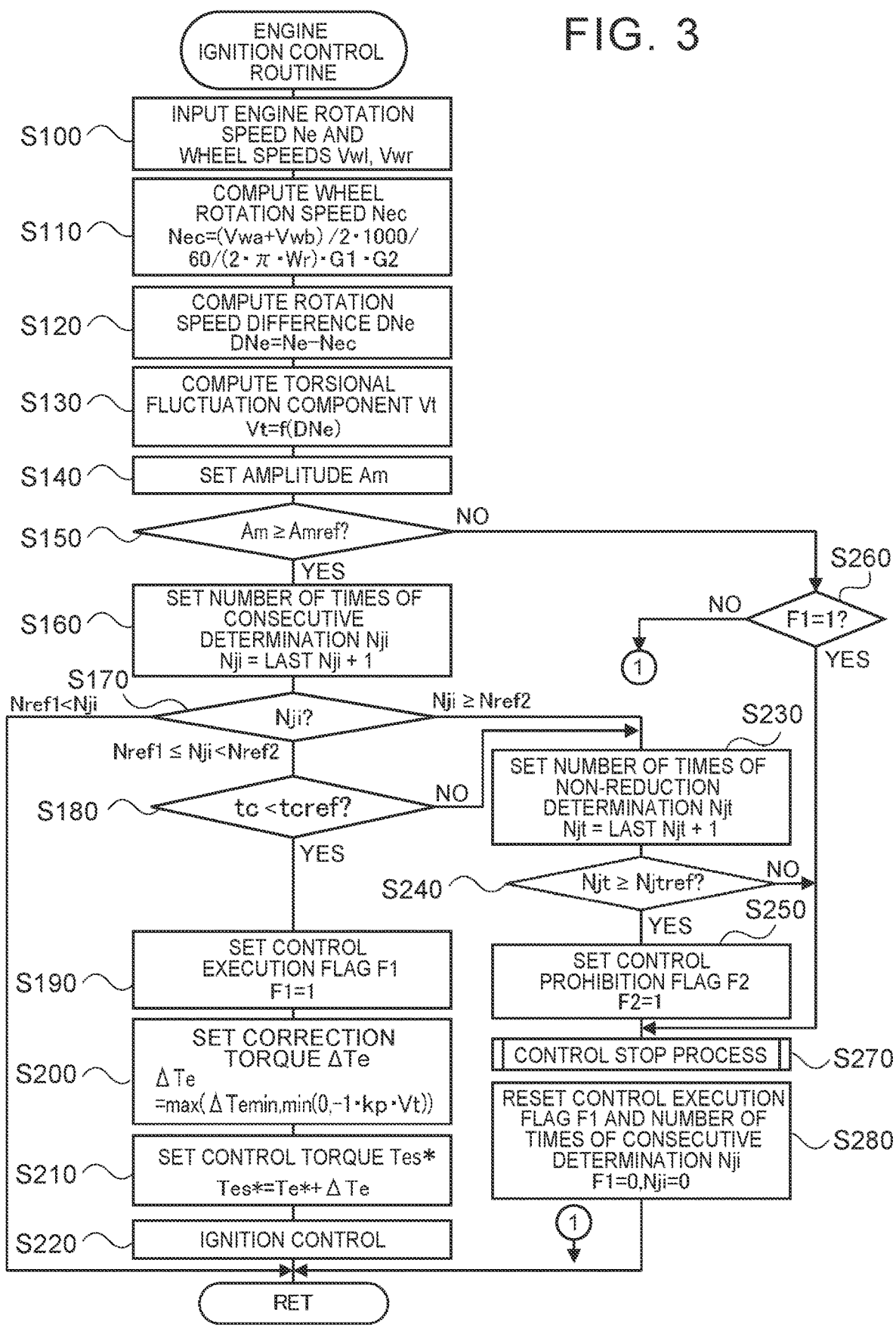
FIG. 3 is a flowchart showing an example of an engine ignition control routine to be executed by an ECU.

Next, the operation of the vehicle 20 of the thus configured embodiment, particularly, the operation at the time of reducing vibrations, will be described. FIG. 3 is a flowchart showing an example of an engine ignition control routine to be executed by the ECU 50. This routine is repeatedly executed when execution of vibration reduction control for reducing the vibrations of the engine 22 is requested. Execution of vibration reduction control is requested when all the five conditions, that is, a first condition, a second condition, a third condition, a fourth condition, and a fifth condition. In the first condition, there is no abnormality in the sensors such as the air-fuel ratio sensors 135a, 135b and the air flow meter 148 used to control the engine 22. In the second condition, the automatic transmission 30 is not in a neutral state. In the third condition, the lockup clutch 28a is engaged. In the fourth condition, the difference between the rotation speed Ne of the engine 22, computed based on the crank angle θcr from the crank position sensor 22a, and the rotation speed of the turbine runner falls with a predetermined range. In the fifth condition, a plurality of the friction engagement elements of the automatic transmission 30 is engaged.

When the routine is executed, the ECU 50 executes a process of inputting the rotation speed Ne of the engine 22 and the wheel speeds Vwa, Vwb (step S100). The rotation speed Ne to be input is computed based on the crank angle θcr from the crank position sensor 22a. The wheel speeds Vwa, Vwb to be input are respectively detected by the wheel speed sensors 70a, 70b.

Subsequently, the ECU 50 computes a wheel rotation speed Nec as the rotation speed of the engine 22 with the following expression 1 by using the wheel speeds Vwa, Vwb, a wheel radius Wr of the drive wheel 36a, a gear ratio G1 of the automatic transmission 30, and a gear ratio G2 of the differential gear (step S110). The rotation speed Nrc of the drive shaft 37 can be computed with the following expression 2 by using the wheel speeds Vwa, Vwb, the wheel radius Wr of the drive wheel 36a, and the gear ratio G2 of the differential gear. Therefore, the wheel rotation speed Nec is obtained by multiplying the rotation speed Nrc of the drive shaft 37 by the gear ratio G2 and is the rotation speed of the engine 22, computed from the rotation speed Nrc of the drive shaft 37.

$$Nec = (Vwa + Vwb)/2 \cdot 1000/60/(2 \cdot \pi \cdot Wr) \cdot G1 \cdot G2 \qquad (1)$$

$$Nrc = (Vwa + Vwb)/2 \cdot 1000/60/(2 \cdot \pi \cdot Wr) \cdot G2 \qquad (2)$$

Subsequently, the ECU 50 computes a rotation speed difference DNe by subtracting the wheel rotation speed Nec from the rotation speed Ne (step S120). Here, the reason why the rotation speed difference DNe is computed will be described.

When the rotation speed Ne of the engine 22 is equal to the wheel rotation speed Nec that is the rotation speed of the engine 22, computed from the wheel speeds Vwa, Vwb (the rotation speed Nrc of the drive shaft 37), that is, when the rotation speed difference DNe is zero, the engine 22 is rotating at the rotation speed corresponding to the wheel speeds Vwa, Vwb. At this time, torsion of the drive-train closer to the drive wheels 36a, 36b than the crankshaft 26 (the torque converter 28, the input shaft 32, the automatic transmission 30, and the drive shaft 37) is not occurring. When the rotation speed Ne of the engine 22 is not equal to the wheel rotation speed Nec, that is, when the rotation speed difference DNe is a positive value or a negative value, the engine 22 is not rotating at the rotation speed corresponding to the rotation speeds of the drive wheels 36a, 36b. At this time, torsion occurs in the drive-train closer to the drive wheels 36a, 36b than the crankshaft 26. Therefore, the rotation speed difference DNe is a parameter that reflects torsion of the drive-train closer to the drive wheels 36a, 36b than the crankshaft 26. For such a reason, the ECU 50 computes the rotation speed difference DNe.

Subsequently, the ECU 50 computes a torsional fluctuation component Vt obtained by applying a phase-lead process, which is a process of advancing a phase by a predetermined amount θref, to a processed rotation speed difference DNeref obtained by filtering the rotation speed difference DNe (step S130).

Figure 4:
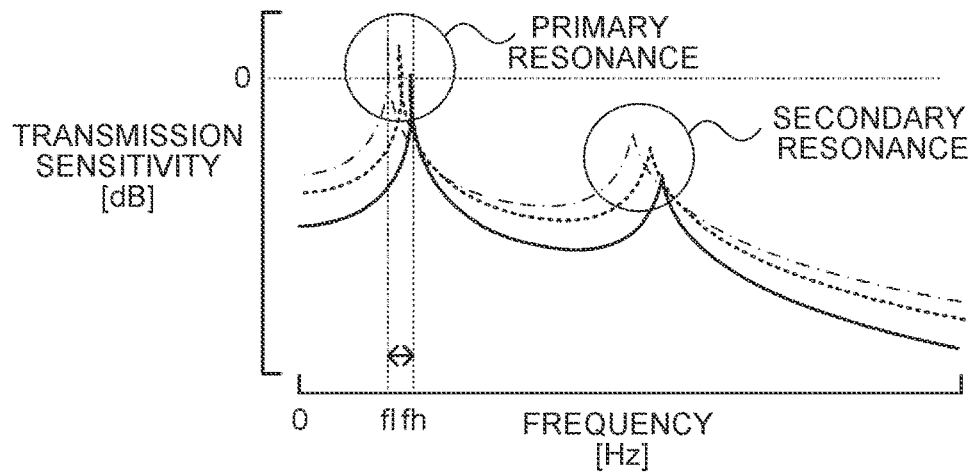
FIG. 4 is a graph illustrating an example of the relationship between the frequency of vibrations of a drive-train excited by torsion, and transmission sensitivity.

Filtering is a process of extracting a signal in a resonant frequency band (a band higher than or equal to a frequency fl (for example, 2 Hz, 3 Hz, 4 Hz, or the like) and lower than or equal to a frequency fh (for example, 8 Hz, 10 Hz, 12 Hz, or the like) corresponding to resonance of the drive-train from the rotation speed difference DNe. FIG. 4 is a graph illustrating an example of the relationship between the frequency of vibrations of the drive-train excited by torsion, and transmission sensitivity. In the graph, the continuous line, the dashed line, and the alternate long and short dashed line respectively illustrate cases where the gears of the automatic transmission 30 are different. As shown in the graph, the transmission sensitivity increases in the frequency band corresponding to primary resonance, so, in the embodiment, a frequency band including the primary resonance in each gear is defined as resonant frequency band. Through such filtering, a signal (noise) in a frequency band different from the resonant frequency band included in the rotation speed difference DNe is removed.

Figure 5:
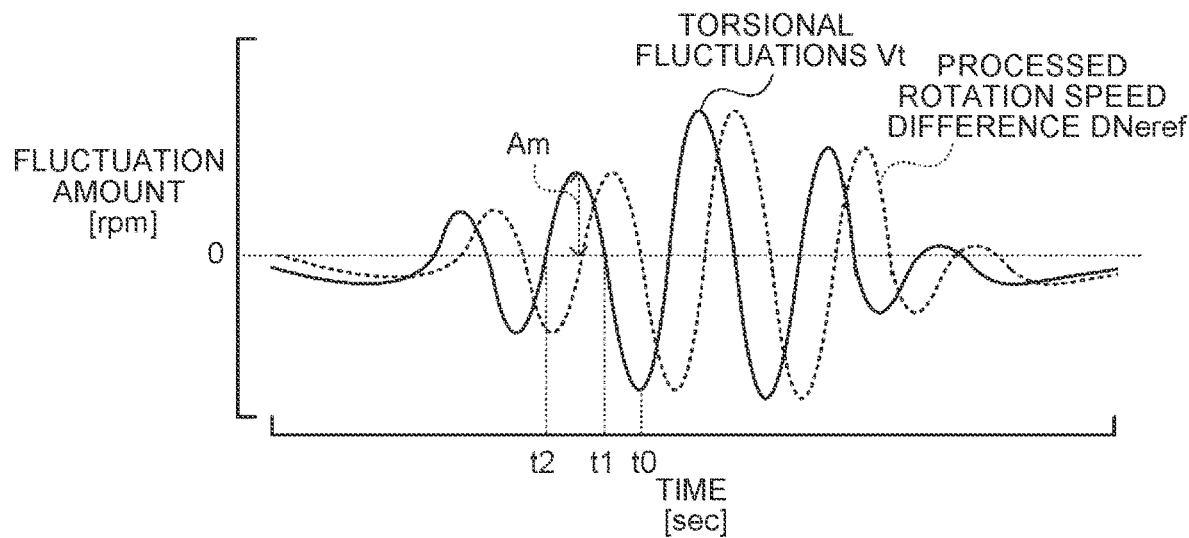
FIG. 5 is a graph illustrating an example of a time change in processed rotation speed difference and a time change in torsional fluctuation component.

The phase-lead process is a process of advancing the phase of the processed rotation speed difference DNeref by the predetermined amount θref. The predetermined amount θref is a phase corresponding to a time required for the process of step S100, step S110, step S120, step S130, step S140, step S150, step S160, step S170, step S180, step S190, step S200, step S210, and step S220 (described later) and is computed as the sum of a first lag amount θref1, a second lag amount θref2, and a third lag amount θref3. The first lag amount θref1 is a time determined in advance as a lag amount corresponding to a time taken until target ignition timing tf* is computed in step S100, step S110, step S120, step S130, step S140, step S150, step S160, step S170, step S180, step S190, step S200, step S210, and step S220 (described later). The second lag amount θref2 is a lag amount corresponding to an average of a time from when the ECU 50 outputs an ignition control signal in step S220 (described later) to when ignition actually takes place and is set based on the number of cylinders of the engine 22 and the rotation speed Ne. The second lag amount θref2 is set so as to increase when the number of cylinders of the engine 22 is small as compared when the number of cylinders of the engine 22 is large (increase as the number of cylinders of the engine 22 reduces) and increase when the rotation speed Ne of the engine 22 is low as compared to when the rotation speed Ne of the engine 22 is high (increase as the rotation speed Ne of the engine 22 decreases). The third lag amount θref3 is a value determined by experiment, analysis, or the like in advance as a lag amount corresponding to a time from when ignition takes place in the engine 22 to when a torque is actually output from the engine 22. FIG. 5 shows an example of a time change in processed rotation speed difference DNeref and a time change in torsional fluctuation component Vt. In the graph, the dashed line represents processed rotation speed difference DNeref, and the continuous line represents torsional fluctuation component Vt.

Subsequently, the ECU 50 sets an amplitude Am of the torsional fluctuation component Vt in a predetermined period (step S140). The predetermined period is defined as a half period that is a period from when the torsional fluctuation component Vt crosses a value of zero and then crosses a value of zero next time. The amplitude Am is set as an amplitude in a period from the timing at which the torsional fluctuation component Vt crossed a value of zero immediately before to the timing at which the torsional fluctuation component Vt crossed a value of zero before that. Therefore, when step S140 is executed at time t0 in FIG. 5, the amplitude in the period from time t1 (timing at which the torsional fluctuation component Vt crossed a value of zero immediately before) to time t2 (the torsional fluctuation component Vt crossed a value of zero before that) is set for the amplitude Am.

Subsequently, it is determined whether the amplitude Am is greater than or equal to a threshold Amref (step S150). The threshold Amref is a value determined in advance as a threshold for determining whether a user feels deterioration of drivability. Therefore, step S150 is a process of determining whether such vibrations that a user feels deterioration of drivability are occurring.

When the amplitude Am is greater than or equal to the threshold Amref in step S150, the ECU 50 determines that such vibrations that a user feels deterioration of drivability are occurring, and sets the number of times of consecutive determination Nji (step S160). The number of times of consecutive determination Nji is the number of times the ECU 50 consecutively determines in step S150 that the amplitude Am is greater than or equal to the threshold Amref. The number of times of consecutive determination Nji is set to a value obtained by adding a value of 1 to the number of times of consecutive determination Nji (last Nji) set in the last step S160. The last Nji is set to a value of zero as an initial value.

Figure 6:
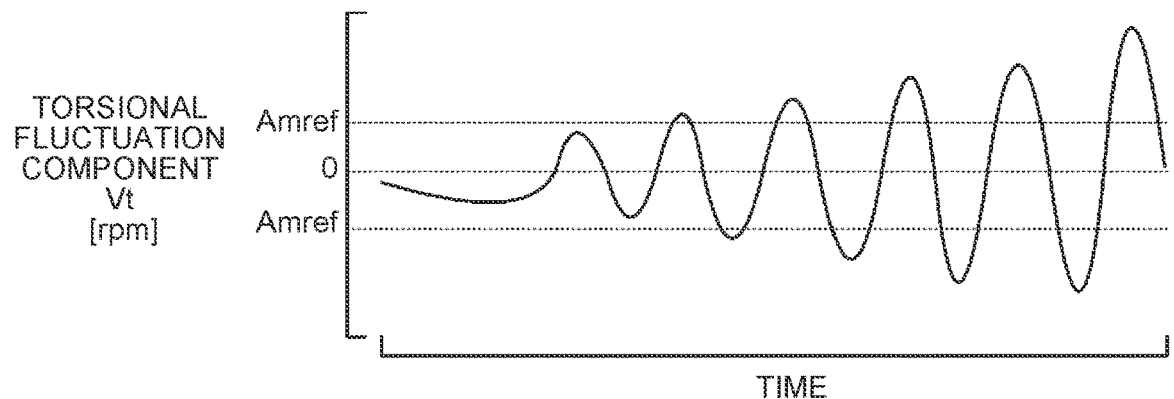
FIG. 6 is a graph illustrating an example of a time change in torsional fluctuation component when an amplitude becomes greater than or equal to a threshold consecutively because of an abnormality.

Subsequently, the ECU 50 compares the number of times of consecutive determination Nji with the thresholds Nref1, Nref2 (step S170). The threshold Nref1 is a threshold of the number of times for determining whether torsional resonance due to torsion of the drive-train is occurring. The threshold Nref1 is set to two or more, for example, two, three, four, or the like. The threshold Nref2 is a threshold for determining whether any abnormality, such as an abnormality of a control signal to be output from the ECU 50 to the engine 22, is occurring. The threshold Nref2 is greater than the threshold Nref1 and is set to, for example, nine, ten, eleven, or the like. FIG. 6 is a graph illustrating an example of a time change in torsional fluctuation component Vt when the amplitude Am becomes greater than or equal to the threshold Amref consecutively because of an abnormality. As shown in the graph, when an abnormality occurs, the torsional fluctuation component Vt can continuously increase. A process of comparing the number of times of consecutive determination Nji with the threshold Nref2 is a process of determining whether such an abnormality is occurring.

When the number of times of consecutive determination Nji is less than the threshold Nref1 in step S170, the ECU 50 ends the routine. In this case, the ECU 50 sets a target torque Te* of the engine 22 such that the required torque Tin* is output to the input shaft 32 of the automatic transmission 30 and executes ignition control over the engine 22 such that ignition takes place at normal ignition timing based on the target torque Te*. The normal ignition timing is optimal ignition timing set in consideration of efficiency or timing earlier than (advanced from) the optimal ignition timing to such an extent that vibrations do not become too large.

When the number of times of consecutive determination Nji is greater than or equal to the threshold Nref1 and less than the threshold Nref2 in step S170, the ECU 50 determines that torsional resonance is occurring, and determines whether a control duration tc that is a time during which the process of step S190, step S200, step S210, and step S220 (described later) is being continuously executed is shorter than a threshold tcref (step S180). The threshold tcref is a threshold for determining whether to stop the process of step S190, step S200, step S210, and step S220 (described later) and is set to, for example, 2.5 seconds, 3.0 seconds, 3.5 seconds, or the like.

When the control duration tc is shorter than the threshold tcref in step S180, the ECU 50 determines that the process of step S190, step S200, step S210, and step S220 can be continuously executed. Then, the ECU 50 sets a control execution flag F1 to a value of 1 (step S190), and sets a correction torque ΔTe to a larger one of a minimum torque ΔTemin and a smaller one of a value of zero and a value obtained by multiplying the torsional fluctuation component Vt by a conversion factor kp and a value of (−1) (step S200). The conversion factor kp of step S200 is a positive value determined in advance as a factor for converting the torsional fluctuation component Vt to torque fluctuations of the engine 22. The minimum torque ΔTemin is a negative value determined in advance as a minimum value of the correction torque ΔTe. Therefore, the correction torque ΔTe is set to a value opposite in phase to the torsional fluctuation component Vt within the range greater than or equal to the minimum torque Temin and less than or equal to a value of zero. The reason why the correction torque ΔTe is set within the range greater than or equal to the minimum torque Temin and less than or equal to a value of zero will be described later.

When the ECU 50 sets the correction torque ΔTe in this way, the ECU 50 sets a control torque Tes* to a value obtained by adding the correction torque ΔTe to the target torque Te* (step S210), executes ignition control over the engine 22 such that the correction torque Tes* is output from the engine 22 (step S220), and ends the routine. Since the correction torque ΔTe is set within the range less than or equal to a value of zero, the control torque Tes* is set to less than or equal to the target torque Te*, and the ignition timing is set to the normal ignition timing or timing later than (retarded from) the normal ignition timing. Since the correction torque ΔTe is set to a torque opposite in phase to the torsional fluctuation component Vt within the range less than or equal to a value of zero and greater than or equal to the minimum torque ΔTemin, torsion of the drive-train is reduced and torsional resonance is suppressed by executing ignition control over the engine 22 at the control torque Tes* obtained by adding the correction torque ΔTe to the target torque Te*. With this configuration, the vibrations of the vehicle 20 are properly reduced.

Here, the reason why the ECU 50 sets the correction torque ΔTe within the range greater than or equal to the minimum torque Temin and less than or equal to a value of zero in step S200 will be described. In the embodiment, the normal ignition timing is set to optimal ignition timing or timing earlier than (advanced from) the optimal ignition timing to such an extent that vibrations do not become too large. Therefore, setting the ignition timing earlier than (advanced from) the normal ignition timing is not desirable from the viewpoint of reducing vibrations. When the correction torque ΔTe becomes a positive value, the control torque Tes* is set so as to be greater than the target torque Te* in step S210, with the result that the ignition timing is made earlier than (advanced from) the normal ignition timing. In the embodiment, the ignition timing is restrained from being earlier than (advanced from) the normal ignition timing by setting the correction torque ΔTe to less than or equal to a value of zero. Setting the correction torque ΔTe to greater than or equal to the minimum torque Temin is to suppress a misfire of the engine 22 and an excessive increase in temperature due to excessively delayed (excessively retarded) ignition timing. In this way, by setting the ignition timing, occurrence of vibrations, a misfire of the engine 22, and an excessive increase in temperature are suppressed.

When the number of times of consecutive determination Nji is greater than or equal to the threshold Nref2 in step S170 or when the control duration tc is longer than or equal to the threshold tcref in step S180 even when the number of times of consecutive determination Nji is greater than or equal to the threshold Nref1 and less than the threshold Nref2 in step S170, the ECU 50 determines that vibrations are not reduced through control over the engine 22 by setting the correction torque ΔTe to a torque opposite in phase to the torsional fluctuation component Vt within the range less than or equal to a value of zero and greater than or equal to the minimum torque ΔTemin, and sets the number of times of non-reduction determination Njt (step S230). The number of times of non-reduction determination Njt is the number of times the ECU 50 determines that vibrations are not reduced even when the engine 22 is controlled by setting the correction torque ΔTe to a torque opposite in phase to the torsional fluctuation component Vt within the range less than or equal to a value of zero and greater than or equal to the minimum torque ΔTemin in the current trip (a period from when the system of the vehicle 20 is started up by turning on the ignition switch 60 to when the system of the vehicle 20 is stopped by turning off the ignition switch 60). The number of times of non-reduction determination Njt is set to a value obtained by adding a value of 1 to the number of times of non-reduction determination Njt (last Njt) set at the time when the last step S230 is executed. The last Njt is set to a value of zero as an initial value and is reset to a value of zero when the ignition switch 60 is turned off to end the trip.

Subsequently, the ECU 50 determines whether the number of times of non-reduction determination Njt is greater than or equal to a threshold Njtref (step S240). The threshold Njtref is a threshold for determining whether vibrations are not reduced due to an abnormality even when the engine 22 is controlled by setting the correction torque ΔTe to a torque opposite in phase to the torsional fluctuation component Vt within the range less than or equal to a value of zero and greater than or equal to the minimum torque ΔTemin.

When the number of times of non-reduction determination Njt is less than the threshold Njtref in step S240, the ECU 50 executes a control stop process (step S270), resets the control execution flag F1 and the number of times of consecutive determination Nji to a value of zero (step S280), and ends the routine.

In the control stop process of step S270, while the ECU 50 gradually increases the correction torque ΔTe (last ΔTe) set during execution of the last routine toward a value of zero, the ECU 50 sets a value obtained by adding the correction torque ΔTe to the target torque Te* for the control torque Tes*, and executes ignition control over the engine 22 such that the control torque Tes* is output from the engine 22. Since the correction torque ΔTe is gradually increased toward a value of zero, the control torque Tes* gradually approaches the target torque Te*. Through such a control stop process, a shock due to a sudden change in the control torque Tes* is reduced.

When the number of times of non-reduction determination Njt is greater than or equal to the threshold Njtref in step S240, the ECU 50 sets a control prohibition flag F2 to a value of 1 (step S250), executes the control stop process (step S270), resets the control execution flag F1 and the number of times of consecutive determination Nji to a value of zero (step S280), and ends the routine. When the number of times of non-reduction determination Njt is greater than or equal to the threshold Njtref, it is presumable that torsional fluctuations due to resonance cannot be reduced because of an abnormality even when the correction torque ΔTe is set to a torque opposite in phase to the torsional fluctuation component Vt within the range less than or equal to a value of zero and greater than or equal to the minimum torque ΔTemin. Therefore, in this case, the ECU 50 sets the control prohibition flag F2 to a value of 1. When the control prohibition flag F2 is a value of 1, the correction torque ΔTe becomes a value of zero in step S270, and the ECU 50 prohibits execution of control of the routine in the current trip after execution of step S280. With this configuration, it is possible to reduce execution of the routine although vibrations cannot be reduced.

When the amplitude Am is less than the threshold Amref in step S150, the ECU 50 determines whether the control execution flag F1 is a value of 1 (step S260). When the control execution flag F1 is a value of zero, the ECU 50 ends the routine. In this case, the ECU 50 sets a target torque Te* of the engine 22 such that the required torque Tin* is output to the input shaft 32 of the automatic transmission 30 and executes ignition control over the engine 22 such that ignition takes place at the normal ignition timing based on the target torque Te*.

When the control execution flag F1 is a value of zero in step S260, the ECU 50 executes the control stop process (step S270), resets the control execution flag F1 and the number of times of consecutive determination Nji to a value of zero (step S280), and ends the routine. With this configuration, when the amplitude Am is reduced, control can be properly completed.

Figure 7:
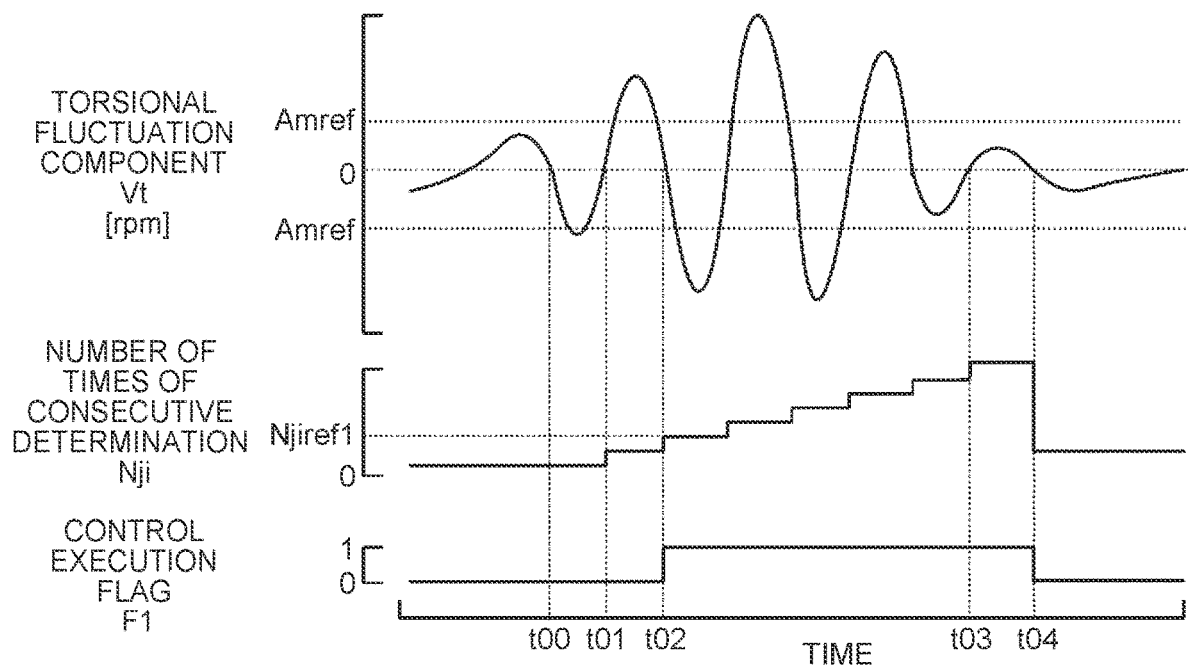
FIG. 7 is a timing chart illustrating an example of a time change in torsional fluctuation component, a time change in the number of times of consecutive determination, and a time change in control execution flag.

FIG. 7 is a timing chart illustrating an example of a time change in torsional fluctuation component Vt, a time change in number of times of consecutive determination Nji, and a time change in control execution flag F1. When the amplitude Am becomes greater than or equal to the threshold Amref, the number of times of consecutive determination Nji increments by a value of 1 (step S160, time t01). When the number of times of consecutive determination Nji becomes greater than or equal to the threshold Njiref1 (step S170, time t02), while the control duration tc is shorter than the threshold tcref, the control execution flag F1 is set to a value of 1 (step S190), and step S200, step S210, and step S220 are executed. Through execution of step S200, step S210, and step S220, torsion of the drive-train is reduced, and torsional resonance is suppressed. When the amplitude Am becomes less than the threshold Amref before the number of times of consecutive determination Nji becomes greater than or equal to the threshold Njiref2 (step S150, step S260, time t04), the control stop process is executed (step S270), and the control execution flag F1 and the number of times of consecutive determination Nj are reset to a value of zero (step S280). In this way, by executing step S200, step S210, and step S220 when the number of times of consecutive determination Nji becomes greater than or equal to the threshold Njiref1, torsion of the drive-train is reduced, and torsional resonance is suppressed. With this configuration, vibrations are further properly reduced.

When the number of times of consecutive determination Nji becomes greater than or equal to the threshold Njiref2 (step S160), the ECU 50 executes the control stop process (step S270), and controls the engine 22 such that the engine 22 is driven at the target torque Te*. Therefore, an increase in vibrations is suppressed.

With the vehicle 20 equipped with the driving source control apparatus of the above-described embodiment, the period and amplitude of the torsional fluctuation component Vt to be obtained by applying the phase-lead process, which is a process of advancing the phase by the predetermined amount θref, to the difference between the rotation speed Ne of the engine 22 and the wheel rotation speed Nec computed from the rotation speed of the drive shaft 37 are repeatedly computed, and, when the number of times of consecutive determination Nji becomes greater than or equal to the threshold Nref1, the engine 22 is controlled so as to be driven at a torque obtained by adding the correction torque ΔTe opposite in phase to the torsional fluctuation component Vt to the target torque Te*. As a result, vibrations of the vehicle 20 are further properly reduced.

When the number of times of consecutive determination Nji becomes greater than or equal to the threshold Njiref2, the control stop process is executed, and the engine 22 is controlled so as to be driven at the target torque Te*. Therefore, an increase in vibrations is further suppressed.

When the predetermined amount θref is set to the sum of the first lag amount θref1 corresponding to a time to compute the target ignition timing tf*, the second lag amount θref2 corresponding to a time from when the ignition control signal is output to when ignition actually takes place in the engine 22, and the third lag amount θref3 corresponding to a time from when ignition takes place in the engine 22 to when a torque is actually output from the engine 22, a lag of the computed torsional fluctuation component Vt of the drive-train from actual torsional fluctuations of the drive-train can be properly compensated.

In the vehicle 20 equipped with the driving source control apparatus of the embodiment, the predetermined amount θref is set to the sum of the first lag amount θref1, the second lag amount θref2, and the third lag amount θref3 in the phase-lead process. Alternatively, the predetermined amount θref may be an invariable predetermined value determined in advance by experiment, analysis, or the like.

In the vehicle 20 equipped with the driving source control apparatus of the embodiment, in step S200, the correction torque ΔTe is set to a larger one of the minimum torque ΔTemin and a smaller one of a value of zero and a value obtained by multiplying the torsional fluctuation component Vt by the conversion factor kp and a value of −1. Alternatively, a value obtained by multiplying the torsional fluctuation component Vt by the conversion factor kp and a value of −1 may be set for the correction torque ΔTe.

Figure 8:
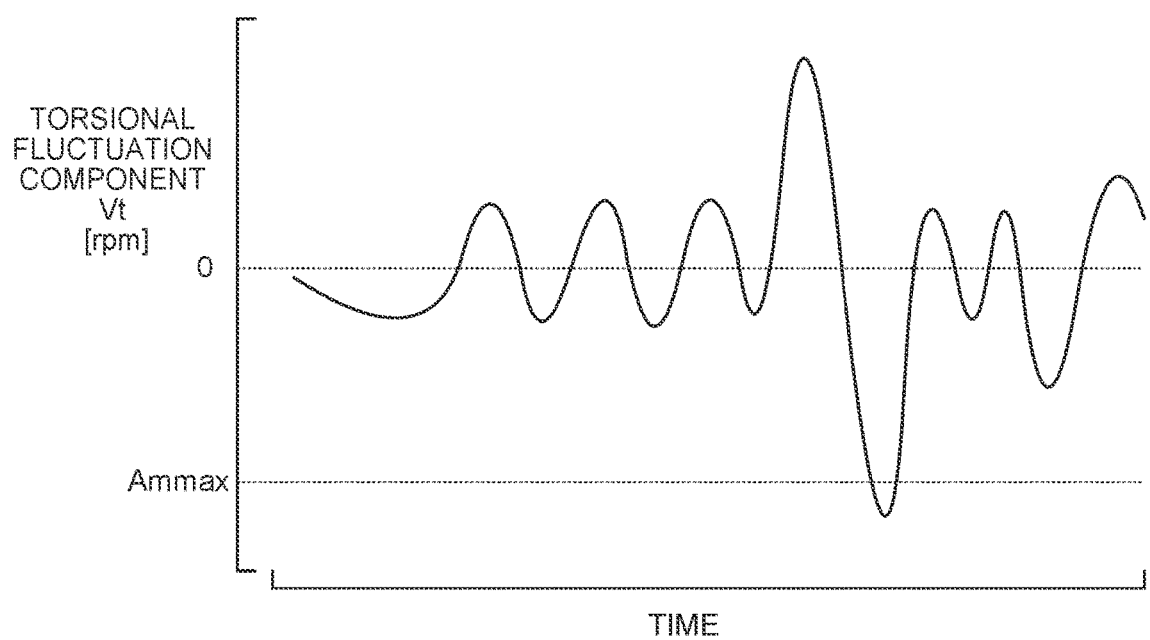
FIG. 8 is a graph illustrating an example of a time change in torsional fluctuation component when large torsional fluctuations that do not occur during normal times are occurring.

In the vehicle 20 equipped with the driving source control apparatus of the embodiment, when the number of times of consecutive determination Nji is greater than or equal to the threshold Nref2 in step S170 or when the control duration tc is longer than or equal to the threshold tcref in step S180 even when the number of times of consecutive determination Nji is greater than or equal to the threshold Nref1 and less than the threshold Nref2 in step S170, the ECU 50 executes step S230, step S240, and step S250, and then executes the control stop process (step S270). However, in addition to step S170 and step S180, the ECU 50 may determine whether the amplitude Am is greater than or equal to a threshold Amrefmax greater than the threshold Amref. The threshold Amrefmax is a threshold for determining whether large torsional fluctuations that do not occur during normal times are occurring and is set to, for example, 25 rpm, 30 rpm, 35 rpm, or the like. FIG. 8 is a graph illustrating an example of a time change in torsional fluctuation component Vt when large torsional fluctuations that do not occur during normal times are occurring. Such large torsional fluctuations presumably occur due to a misfire or abnormal fuel injection of the engine 22. Therefore, when the amplitude Am is greater than or equal to the threshold Amrefmax, the ECU 50 executes step S230, step S240, and step S250, and then executes the control stop process (step S270). Thus, when a misfire or abnormal fuel injection is occurring in the engine 22, further execution of control different from normal control is suppressed.

In the vehicle 20 equipped with the driving source control apparatus of the embodiment, the ECU 50 executes the control stop process in step S270 to gradually bring the control torque Tes* close to the target torque Te*, thus suppressing a sudden change in torque. However, when a sudden change in torque is permitted, the control torque Tes* may be immediately set to the target torque Te* in step S270.

In the vehicle 20 equipped with the driving source control apparatus of the embodiment, in control over the engine 22, the normal ignition timing is optimal ignition timing set in consideration of efficiency or the like or timing earlier than (advanced from) the optimal ignition timing to such an extent that vibrations do not become too large. Alternatively, the normal ignition timing may be set to timing later than the optimal ignition timing.

In the embodiment, the present disclosure is applied to the vehicle 20 including the engine 22, the torque converter 28, and the automatic transmission 30. Alternatively, a manual transmission may be used instead of the torque converter 28 and the automatic transmission 30.

The present disclosure may be applied to a vehicle in which a crankshaft of an engine and a rotary shaft of a motor are connected via a clutch and the rotary shaft of the motor is connected to a drive shaft coupled to axles via an automatic or manual transmission. In this case, the period and amplitude of the torsional fluctuation component Vt to be obtained by applying the phase-lead process, which is the process of advancing the phase by the predetermined amount θref, to the difference between the rotation speed of the engine or the motor and the wheel rotation speed Nec computed from the rotation speed of the drive shaft just need to be repeatedly computed, and, when the number of times of consecutive determination Nji becomes greater than or equal to the threshold Nref1, the engine or the motor just needs to be controlled so as to be driven at a torque obtained by adding the correction torque ΔTe opposite in phase to the torsional fluctuation component Vt to the target torque Te*.

The present disclosure may be applied to a vehicle in which a motor is connected via a transmission or without intervening a transmission to a drive shaft coupled to axles. In this case, the period and amplitude of the torsional fluctuation component Vt to be obtained by applying the phase-lead process, which is the process of advancing the phase by the predetermined amount θref, to the difference between the rotation speed of the motor and the wheel rotation speed Nec computed from the rotation speed of the drive shaft just need to be repeatedly computed, and, when the number of times of consecutive determination Nji becomes greater than or equal to the threshold Nref1, the motor just needs to be controlled so as to be driven at a torque obtained by adding the correction torque ΔTe opposite in phase to the torsional fluctuation component Vt to the target torque Te*. The present disclosure may be implemented as a driving apparatus including the engine 22, the torque converter 28, and the automatic transmission 30 or may be implemented as a driving source control apparatus that controls the engine 22.

The correspondence relation between major elements of the embodiment and major elements of the present disclosure described in Summary will be described. In the embodiment, the engine 22 may be regarded as the driving source, and the ECU 50 may be regarded as the electronic control unit of the driving source control apparatus.

The correspondence relation between major elements of the embodiment and major elements of the present disclosure described in Summary does not limit the elements of the present disclosure described in the Summary since the embodiment is an example for specifically describing the aspect of the present disclosure described in the Summary. In other words, the present disclosure described in the Summary should be interpreted based on the description therein, and the embodiment is only a specific example of the present disclosure described in the Summary.

The embodiment of the present disclosure is described above; however, the applicable embodiment is not limited to the embodiment and may be, of course, modified into various forms without departing from the scope of the present disclosure.

The present disclosure is usable in the industry of manufacturing driving source control apparatuses.

What is claimed is:

1. A driving source control apparatus used for a driving apparatus including a driving source, the driving source being connected to a drive-train including a drive shaft, the driving source control apparatus being configured to control the driving source such that the driving source is driven at a torque based on a target torque, the driving source control apparatus comprising an electronic control unit configured to repeatedly compute a period and amplitude of torsional fluctuations of the drive-train to be obtained by applying a phase-lead process, which is a process of advancing a phase by a predetermined amount, to a difference between a rotation speed value of the driving source computed from a crank angle and a rotation speed value of the driving source computed from a rotation speed of the drive shaft, and when the computed amplitude of the torsional fluctuations in a predetermined period becomes greater than or equal to a predetermined amplitude at least two times consecutively, execute predetermined control in which the driving source is controlled so as to be driven at a torque obtained by adding a correction torque opposite in phase to the torsional fluctuations to the target torque.

2. The driving source control apparatus according to claim 1, wherein:
the electronic control unit is configured to, when the computed amplitude of the torsional fluctuations in the predetermined period becomes greater than or equal to the predetermined amplitude a first number of times that is at least two times consecutively, execute the predetermined control; and
the electronic control unit is configured to, during execution of the predetermined control, when the computed amplitude of the torsional fluctuations in the predetermined period becomes greater than or equal to the predetermined amplitude a second number of times greater than the first number of times, stop execution of the predetermined control and control the driving source such that the driving source is driven at the target torque.

3. The driving source control apparatus according to claim 1, wherein:
the driving source is an internal combustion engine;
in the predetermined control, a target ignition timing is computed such that the torque obtained by adding the correction torque to the target torque is output, a control signal is output to the internal combustion engine such that ignition takes place at the target ignition timing, and the internal combustion engine is controlled by using the control signal; and
the predetermined amount is the sum of a first lag amount corresponding to a time required to compute the target ignition timing, a second lag amount corresponding to a time from when the control signal is output to when the ignition takes place in the internal combustion engine, and a third lag amount corresponding to a time from when the ignition takes place in the internal combustion engine to when the torque obtained by adding the correction torque to the target torque is output from the internal combustion engine.

* * * * *